(12) United States Patent
Baldwin

(10) Patent No.: US 11,991,997 B2
(45) Date of Patent: May 28, 2024

(54) SPINCAST REELS

(71) Applicant: DQC International Corp., Clearwater, FL (US)

(72) Inventor: Matt Baldwin, Palm Harbor, FL (US)

(73) Assignee: DQC International Corp., Clearwater, FL (US)

( * ) Notice: Subject to any disclaimer, the term of this patent is extended or adjusted under 35 U.S.C. 154(b) by 0 days.

(21) Appl. No.: 18/046,019

(22) Filed: Oct. 12, 2022

(65) Prior Publication Data

US 2024/0122166 A1    Apr. 18, 2024

(51) Int. Cl.
*A01K 89/01* (2006.01)
*A01K 89/00* (2006.01)
*A01K 89/015* (2006.01)

(52) U.S. Cl.
CPC ........ *A01K 89/0183* (2015.05); *A01K 89/006* (2013.01); *A01K 89/0175* (2015.05); *A01K 89/0192* (2015.05)

(58) Field of Classification Search
CPC .......... A01K 89/0102; A01K 89/01025; A01K 89/01026; A01K 89/01029; A01K 89/0175; A01K 89/0183
See application file for complete search history.

(56) References Cited

U.S. PATENT DOCUMENTS

| | | | | |
|---|---|---|---|---|
| 3,185,405 A * | 5/1965 | Hull | ................... | A01K 89/0102 242/240 |
| 3,327,963 A * | 6/1967 | Thomas | ............. | A01K 89/0102 242/236 |
| RE28,286 E * | 12/1974 | Johnson | ............. | A01K 89/0102 242/240 |
| 4,156,510 A * | 5/1979 | Hull | ................... | A01K 89/0102 242/240 |
| 6,375,107 B1 * | 4/2002 | Wong | ................. | A01K 89/0102 242/240 |
| 6,726,137 B1 * | 4/2004 | Li | ...................... | A01K 89/0102 242/246 |
| 7,290,727 B1 * | 11/2007 | Matsuda | ............ | A01K 89/0102 242/256 |
| 9,210,920 B1 * | 12/2015 | Zwayer | ................... | A01K 89/02 |
| 9,288,973 B1 * | 3/2016 | Zwayer | ............. | A01K 89/0102 |
| 10,660,322 B1 * | 5/2020 | Zwayer | ............. | A01K 89/0102 |

* cited by examiner

*Primary Examiner* — Emmanuel M Marcelo

(74) *Attorney, Agent, or Firm* — Maxey-Fisher, PLLC; Brittany J. Maxey-Fisher

(57) ABSTRACT

A spincast reel having a central body having a front cover, a rear cover, a foot extending from the rear cover and adapted to be connected to a fishing bole; an opening on the front cover adapted to receive a fishing line; a spool hub; a handle connected to the central body; a transversal shaft connected to the handle; a main shaft extending axially through the spool hub; bushings, a drive gear, and a pinion gear operatively connected to the transversal shaft, the bushings, the drive gear, and the pinion gear rotate the transversal shaft; a first pickup pin and a second pickup pin located inside the spool hub, the first and the second pickup pins located diametrically opposed to each other; and the first and the second pickup pins move parallel to the fishing pole towards the front cover in a first position and towards the rear cover in a second position.

4 Claims, 4 Drawing Sheets

SPINCAST REELS

FIELD OF THE INVENTION

This invention relates to spincasting reels, and more particularly, to spincasting reels specifically designed to prevent fishing line from supping off the pins.

BACKGROUND OF THE INVENTION

Spincast reels (closed-face spinning) were designed as a category of fishing reels that made casting easier for anglers, their push button operation was a stark contrast to the more difficult to use baitcasting reels. Spincast reels are one of the most popular types of reels because they are the easiest to use and their affordable cost allows for an attractive entry for most anglers around the world.

Unfortunately, the spincast reels have a disadvantage, when sometimes the line gets loose and slips off over and around the outward facing pickup pin. When this occurs, the reel function is inhibited or completely stopped.

Therefore, there is a need for an improvement to a spincast reel to prevent the fishing line from slipping off from the pickup pin.

SUMMARY OF THE INVENTION

A spincast reel having a central body, having a front cover, a rear cover, a foot extending from the rear cover and adapted to be connected to a fishing pole; an opening on the front cover adapted to receive a fishing line; a spool hub; a handle connected to the central body; a transversal shaft connected to the handle; a main shaft extending axially through the spool hub; bushings, a drive gear, and a pinion gear operatively connected to the transversal shaft, the bushings, the drive gear, and the pinion gear rotate the transversal shaft; a first pickup pin and a second pickup pin located inside the spool hub, the first and the second pickup pins located diametrically opposed to each other; and the first and the second pickup pins move parallel to the fishing pole towards the front cover in a first position and towards the rear cover in a second position.

BRIEF DESCRIPTION OF THE DRAWINGS

The invention, together with its objects and the advantages thereof, may be best understood by reference to the following description taken in conjunction with the accompanying drawings, in which like reference numerals identify like elements in the figures and in which.

DETAILED DESCRIPTION OF THE PREFERRED EMBODIMENT

Figure 1:
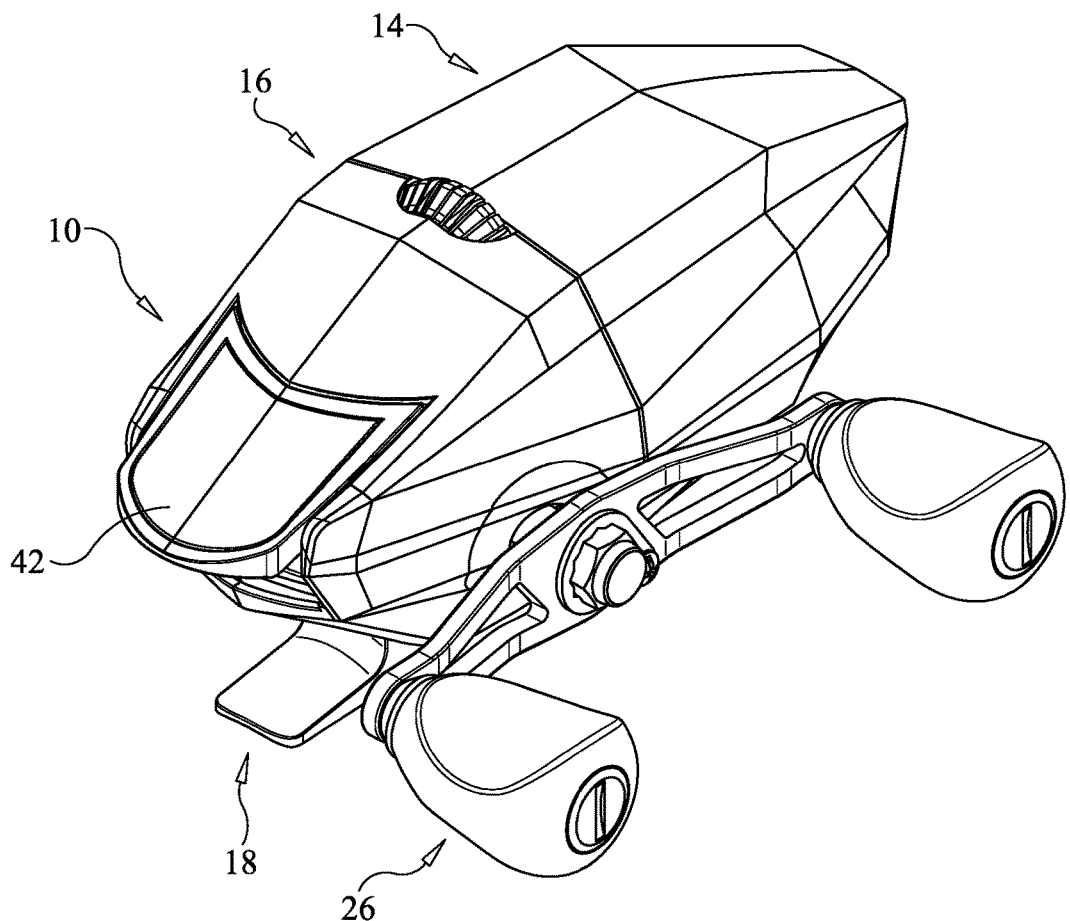
FIG. 1 is a perspective front view of the spincast reel according to the present invention.
Figure 2:
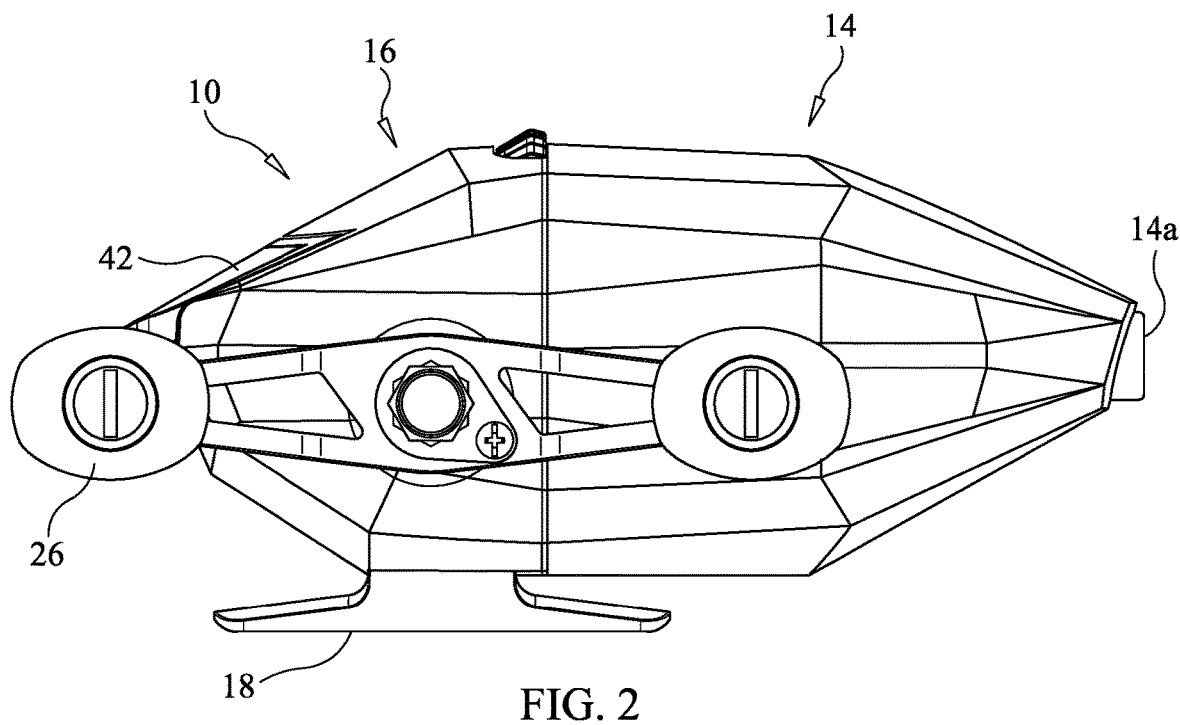
FIG. 2 is a side view of the spincast reel of FIG. 1.

In the present invention, terms such as "upper," "lower," "side," "top" "bottom," "vertical," "horizontal," etc. refer to the apparatus when in the orientations shown in the drawing. The skilled artisan will recognize that objects in accordance with the present disclosure can assume different orientations when in use.

Figure 3:
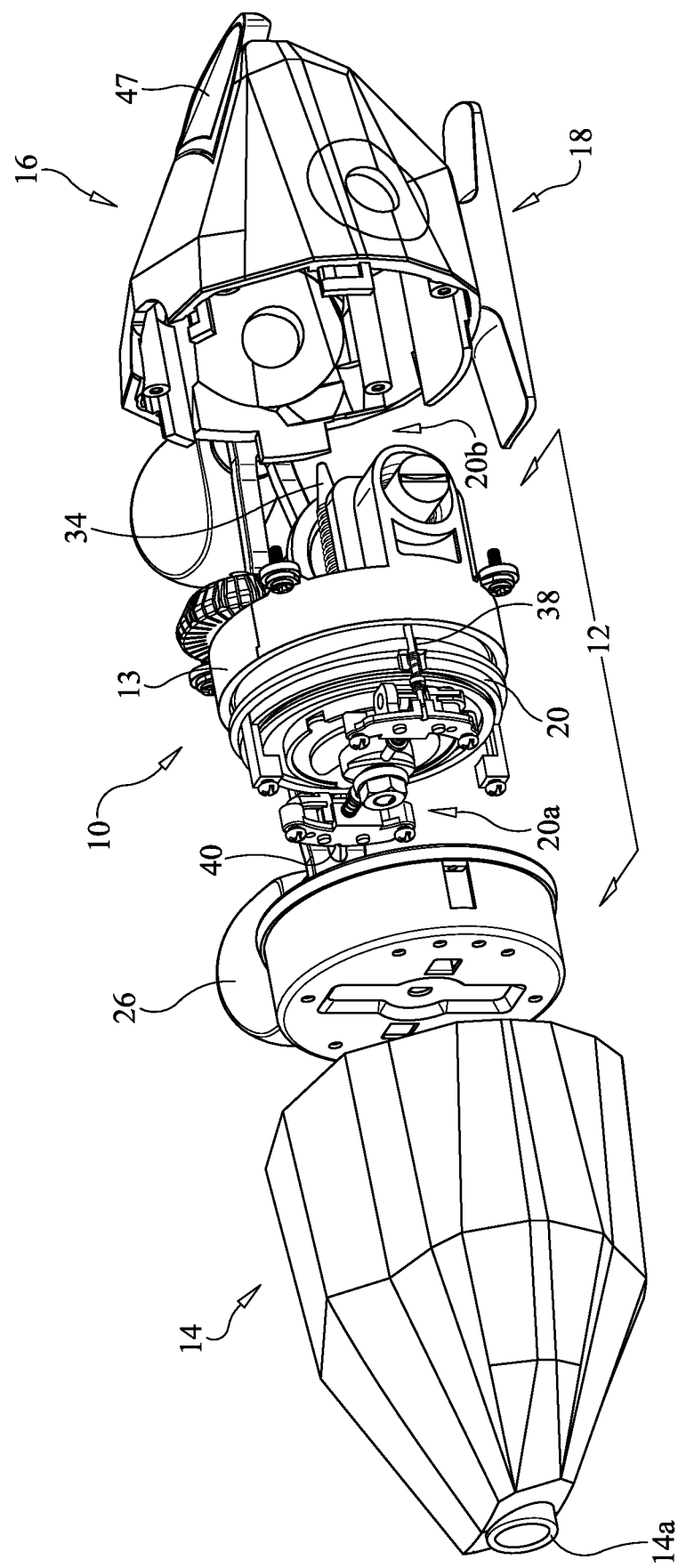
FIG. 3 is an exploded front view of the components of inside the body of the spincast reel of FIG. 1.
Figure 4:
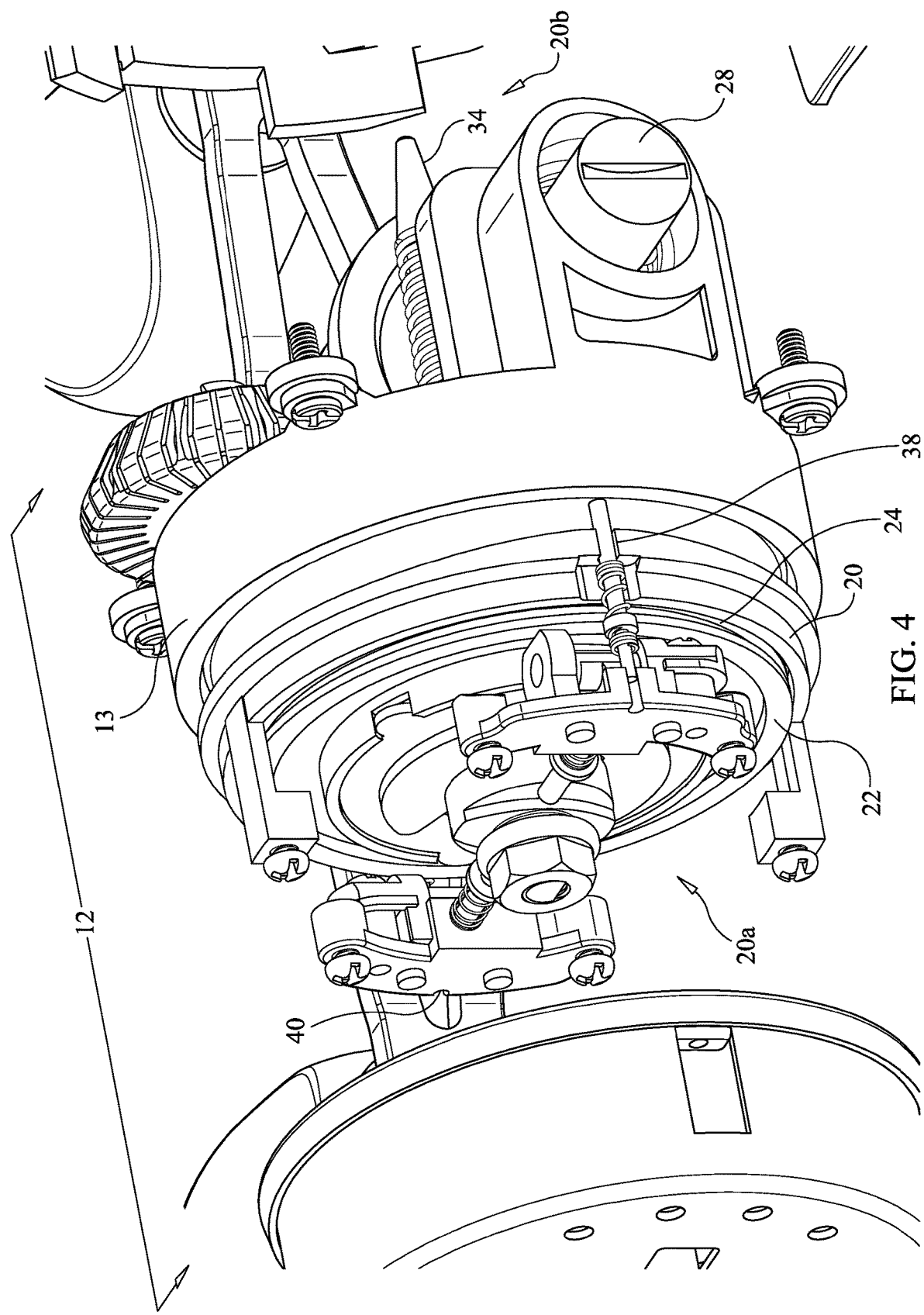
FIG. 4 is a detailed view of the inside of the spincast reel of FIG. 3.
Figure 5:
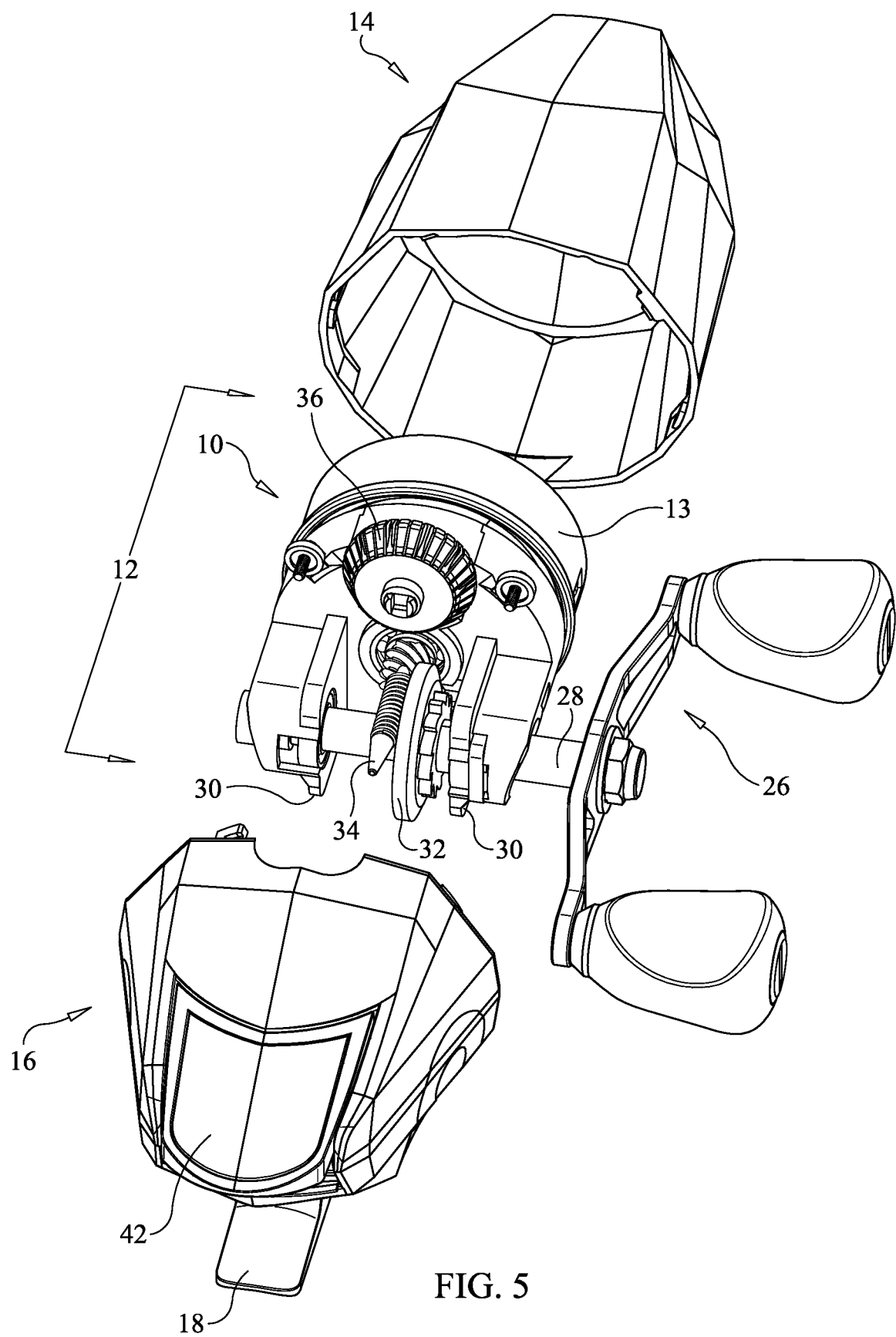
FIG. 5 is an exploded rear view of the components of inside the body of the spincast reel of FIG. 1.

The spincast reel 10, according to the present invention, is designed to be mounted on a fishing pole (not shown). The spincast reel 10 includes a central body 12 (FIGS. 3-5) that is used to support a majority of the elements of the spincast reel 10. The central body 12 includes a front cover 14, a rear cover 16, a foot 18 extending from the rear cover 16, a spool hub 20, a handle 26 connected to a transversal shaft 28, and a main shaft 36 extending axially through the spool hub 20.

The central body 12 may be made of a metal, moldable plastic, or composite material, such as cast aluminum, Acrylonitrile Butadyene Styrene (ABS), or glass filled polycarbonate.

The foot 18 is designed to connect the spincast reel 10 to the fishing pole.

The spool hub 20 is mounted on the central body 12 and is adapted to hold a fishing line 24. The spool hub 20 includes a circular wall 13 that divides the spool hub 20 into a front section 20a and rear section 20b, and a line spool 22 adapted to hold the fishing line 24 coiled inside thereof.

The handle 26 extends from the side of the fishing reel for retrieval of the fishing line 24 around the spool hub 20 contained within the front cover 14 of the reel. The handle 26 is rotated by a user when it is desired to bring the wind fishing line 24 back in. The handle 26 is attached to a transverse shaft 28 located on the rear section 20b of the spool hub 20. The transverse shaft 28 rotates by the action of the bushings 30, a drive gear 32, and a pinion gear 34, causing the rotation of the main shaft 36 that extends through the length of the spool hub 20. The bushings 30, the drive gear, and the pinion gear 34 are operatively connected to each other and to the transverse shaft 28, as is conventional in the art.

The front cover 14 covers the front section 20a of the spool hub 20. The rear cover 16 covers the rear section 20b of the spool hub 20. The front cover 14 may have any shape, preferably a conical shape. The connection of the front cover 14 to the central body 12 can be by any type of releasable type fasteners known in the art, for example a threaded turn and click system or threaded screws.

The front cover 14 includes an opening 14a through which the fishing line 24 extends and is retrieved during the casting and winding processes, respectively. The line 24 passes through the opening 14a and then around the spool hub 20 and finally into the line spool 22.

A first pickup pin 38 and a second pickup pin 40 are located inside the spool hub 20. The second pickup pin 40 is identical and works in the same way as the first pickup pin 38. The pickup pins 38, 40 are located diametrically opposed to each other. The pickup pins 38, 40 are designed to engage the fishing line as the spool hub 20 is rotated by the handle 26 and then winds the line 24 around the line spool 22. The pickup pins 38, 40 are spring-loaded.

The pickup pins 38, 40 move between a first position towards the front cover 14 to allow casting of the fishing line and a second position towards the rear cover 16 to pick up the fishing line.

A thumb bar or button 42 may be located on the rear cover 16 toward the angler's hand. The thumb bar or button 42 is mechanically linked to the pickup pins 38, 40 by a mechanical system.

The mechanical system maintains the pickup pins 38, 40 in the first position when the thumb bar or button 42 is pressed forward and moves the pickup pins 38, 40 into the second position when the activation button 42 is released.

Specifically, the back-and-forth movement direction of the pickup pins 38, 40, different from the in and out direction movement of the traditional systems, is the key factor of the present invention. The present design has a significant advantage over the traditional system, as the line cannot slip off the pins (this is a common problem with spincast when the line is loose and has no tension). The present invention creates a line pickup system that eliminates the most common "failure" of the traditional design.

In the present invention, the pins 38, 40 move in a forward and backward motion in relationship to the fishing rod it would be used with. Specifically, the pickup pins 38, 40 move parallel to the fishing pole within the reel.

In the present invention, as the transverse shaft 28 is rotated by the action of the bushings 30, the drive gear 32, and the pinion 34, causes the rotation of the main shaft 36 that rotates the spool hub 20 which induces the spring-loaded pickup pins 38, 40 to slide down parallel to the fishing rod in the "line retrieving" position, allowing the angler to turn the handle 26, which turns the drive gear 32, which turns the spool hub 20, winding the line 24 onto the line spool 22. The spring-loaded pickup pins 38, 40 slide up parallel to the fishing rod in the "casting" position when the button or thumb bar 42 is pushed by the angler. This allows the line 24 to flow out from the line spool 22 to allow cast-ability.

This is different from all of the current spinner head designs that use a line pickup pin that runs perpendicular to the rod. In the current spinner head designs, the pickup pins stick outward when in the "line retrieving" position and when the line coming through the opening of the cover to the spool gets loose, missing the perpendicular protruding line pickup pin, causing failure to retrieve the line when the handle is turned.

In the present invention, the parallel pickup pin system prevents this disadvantage of the known spinner head devices.

It will be understood that the invention may be embodied in other specific forms without departing from the spirit or central characteristics thereof. The present examples and embodiments, therefore, are to be considered, in all respects, as illustrative and not restrictive, and the invention is not limited to the details given herein.

The invention claimed is:

1. A spincast reel comprising:
   a central body having a front cover, a rear cover, a foot extending from the rear cover and adapted to be connected to a fishing pole;
   an opening on the front cover adapted to receive a fishing line;
   a spool hub;
   a circular wall dividing the spool hub into a front section and a rear section, wherein the front cover of the central body covers the front section of the spool hub and the rear cover of the central body covers the rear section of the hub;
   a line spool inside the spool hub and adapted to hold the fishing line, the fishing line passes through the opening of the front cover, then around the spool hub and finally into the line spool;
   a handle connected to the central body, the handle;
   a transversal shaft connected to the handle;
   a main shaft extending axially through the spool hub;
   bushings, a drive gear, and a pinion gear operatively connected to the transversal shaft, wherein the handle rotates the transverse shaft, the bushings support the transverse shaft for rotation, the drive gear is mounted on the transverse shaft and the rotation of the transverse shaft rotates the drive gear and drive gear drives the pinion gear;
   a first pickup pin and a second pickup pin located inside the spool hub, wherein the first and the second pick up pins are spring loaded, wherein the first and the second pickup pins located diametrically opposed to each other; and
   wherein the first and the second pickup pins move parallel to the fishing pole in a forward direction towards the front cover and in a backward direction towards the rear cover.

2. The spincast reel according to claim 1, wherein the first pickup pin and the second pickup pin are spring-loaded.

3. The spincast reel according to claim 1, wherein as the transverse shaft is rotated by the action of the bushings, the drive gear and the pinion causes the rotation of the main shaft, inducing the first and the second pickup pins to slide down in the forward direction, allowing an angler to turn the handle, which turns the drive gear, which turns the spool hub winding the line onto the line spool, wherein the first and the second pickup pins slide up to the backward direction, a button or a thumb bar is pushed by the angler allowing the fishing line to flow out from the line spool to allow cast-ability.

4. The spincast reel according to claim 1, wherein the front cover of the central body has a conical shape.

* * * * *